United States Patent
Robison et al.

(10) Patent No.: US 12,135,795 B2
(45) Date of Patent: Nov. 5, 2024

(54) SYSTEMS AND METHODS FOR REMOTE SECURE ERASURE OF FINGERPRINT DATA FROM INFORMATION HANDLING SYSTEMS

(71) Applicant: DELL PRODUCTS L.P., Round Rock, TX (US)

(72) Inventors: Charles D. Robison, Buford, GA (US); Girish S. Dhoble, Austin, TX (US); Daniel L. Hamlin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 303 days.

(21) Appl. No.: 17/581,642

(22) Filed: Jan. 21, 2022

(65) Prior Publication Data

US 2023/0237162 A1 Jul. 27, 2023

(51) Int. Cl.
G06F 21/60 (2013.01)

(52) U.S. Cl.
CPC ...... *G06F 21/60* (2013.01); *G06F 2221/2143* (2013.01)

(58) Field of Classification Search
CPC .................. G06F 21/60; G06F 2221/2143
See application file for complete search history.

(56) References Cited

U.S. PATENT DOCUMENTS

| | | | |
|---|---|---|---|
| 8,245,053 B2* | 8/2012 | Hoang | G06F 21/575 713/192 |
| 2010/0083357 A1* | 4/2010 | Challener | G06F 21/575 726/6 |
| 2010/0250944 A1* | 9/2010 | Suzuki | H04L 63/0861 713/172 |
| 2012/0054741 A1* | 3/2012 | Ali | G06F 9/45545 718/1 |
| 2014/0344921 A1* | 11/2014 | Hamlin | G06V 40/1365 726/19 |
| 2018/0109418 A1* | 4/2018 | Cammarota | H04W 12/50 |
| 2019/0042756 A1* | 2/2019 | Lal | H04L 9/3234 |
| 2023/0102228 A1* | 3/2023 | Okuno | G06F 21/78 726/27 |

OTHER PUBLICATIONS

Lockhart, What is PC as a Service (PCaaS)?—Definition From WhatIs.com; Captured from Internet Nov. 29, 2021, 4 pgs.
(Continued)

*Primary Examiner* — Saleh Najjar
*Assistant Examiner* — Devin E Almeida
(74) *Attorney, Agent, or Firm* — Egan, Enders & Huston LLP.

(57) ABSTRACT

Systems and methods are provided that may be implemented by services executing on one or more remote servers and on an endpoint information handling system to remotely erase (i.e., clear or remove) biometric fingerprint credential data that is previously stored on non-volatile memory of a discrete "match-on chip" fingerprint reader (MOFR) of the endpoint information handling system, as well as to erase separate non-biometric OS user identifier (ID) fingerprint enrollment information stored on separate system non-volatile memory of the endpoint information handling system.

22 Claims, 4 Drawing Sheets

(56) References Cited

OTHER PUBLICATIONS

Dell Control Vault, "VA Technical Reference Model v 21.11", Jul. 15, 2020, 2 pgs.
Boyapalle et al., "Systems and Methods for Associating Attested Information Handling Systems to End User Accounts", U.S. Appl. No. 17/354,654, filed Jun. 22, 2021, 30 pgs.
Boyapalle et al., "Systems and Methods for Transferring Information Handling Systems", U.S. Appl. No. 17/542,360, filed Dec. 3, 2021, 42 pgs.
Low et al., "Systems and Methods to Orchestrate Trusted Enrollment", U.S. Appl. No. 17/458,088, filed Aug. 26, 2021, 34 pgs.
Phelps et al., "Dell Technologies Supply Chain Security: Secured Component Verification for PowerEdge", Direct From Development, 2020, 3 pgs.
Wikipedia, "X.509", Obtained from Internet Jan. 13, 2022, 18 pgs.
Microsoft, "Windows Hello for Business Overview", Dec. 3, 2021, 8 pgs.
Dell US, "What Is Windows Hello?", Obtained From Internet Dec. 19, 2021, 9 pgs.
Mitek Systems, "What Are Biometrics—A Complete Guide", Mar. 25, 2020, 4 pgs.
Design News, "Single-Chip Fingerprint IC", Oct. 9, 2006, 2 pgs.
Thakkar, "Fingerprint Match on Card: Smart Cards Meet Biometrics", Obtained from Internet Dec. 19, 2021, 6 pgs.
Dell Technologies, "Securing Business in a World of Transformation", Vmware, Oct. 2021, 11 pgs.
Dell, "Dell EMC Secured Component Verification Reference Guide for Servers", Obtained from Internet Dec. 31, 2021, 1 pg.
Dell ControlVault, "Installation Instructions for the ControlVault Update", Dec. 2013, 8 pgs.
National Institute of Standards and Technology, "BIOS Protection Guidelines for Servers", Special Publication 800-147B, Jul. 2012, 31 pgs.
UEFI Shell Specification, Revision 2.2, Jan. 2016, 258 pgs.

\* cited by examiner

SYSTEMS AND METHODS FOR REMOTE SECURE ERASURE OF FINGERPRINT DATA FROM INFORMATION HANDLING SYSTEMS

FIELD

This application relates to information handling systems and, more particularly, to fingerprint data stored on information handling systems.

BACKGROUND

As the value and use of information continues to increase, individuals and businesses seek additional ways to process and store information. One option available to human users is information handling systems. An information handling system generally processes, compiles, stores, and/or communicates information or data for business, personal, or other purposes thereby allowing human users to take advantage of the value of the information. Because technology and information handling needs and requirements vary between different human users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific human user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems, such as notebook computers, often employ a discrete "match-on chip" fingerprint reader chip that is implemented by a microcontroller that is separate from the host central processor unit (CPU) of the information handling system. One example of such a match-on chip fingerprint reader chip is known as a "ControlVault" available from Dell Technologies of Round Rock, Texas. A match-on chip fingerprint reader chip includes non-volatile memory that securely stores the biometric fingerprint credential data as reference fingerprint template/s (in the form of mathematical representation/s of unique physiological fingerprint patterns of fingers of one or more respective human users) for authorized users in encrypted form on non-volatile memory of the match-on chip fingerprint reader in a manner that prevents the user biometric fingerprint credential template data from being accessed and read from outside the match-on chip. The match-on chip fingerprint reader is typically coupled to a capacitive fingerprint sensor that senses a current user's fingerprint biometric data and provides it to the match-on chip fingerprint reader. The match-on chip fingerprint reader in turn attempts to match the stored biometric fingerprint credential data for authorized users to the current user's biometric fingerprint data that is provided by the capacitive fingerprint sensor. This fingerprint matching operation is performed entirely on the match-on fingerprint chip, and the biometric fingerprint data of the current user and the stored biometric fingerprint credential data in the fingerprint template/s of the authorized users is kept separate and apart from the host CPU of the information handling system.

Windows Hello is a software framework implemented by the Microsoft Windows operating system (OS) executing on a host CPU of an information handling system, and which is provided by Microsoft Corporation of Redmond, Washington. Windows Hello is so implemented to allow a user to sign into the Windows OS by providing an interface between the information handling system user and the match-on chip fingerprint reader. Windows OS and Windows Hello does not have access to either the sensed biometric fingerprint data of a current user, or the biometric fingerprint credential data of the fingerprint template/s that is stored on the match-on chip fingerprint reader for authorized users. Instead, the match-on chip fingerprint reader communicates an indication signal to the Windows OS to tell Windows Hello whether or not a match exists between the stored biometric fingerprint credential data for authorized users and the current user's biometric fingerprint data. Windows Hello allows the current user to sign in to the Windows OS when the match-on chip fingerprint reader indicates that such a match exists, but prevents the current user from signing in to the Windows OS when the match-on chip fingerprint reader indicates that such a match does not exist.

With the increase in remote work, cloud-based management of endpoint information handling systems and productization of end-to-end lifecycle management services (e.g., such as PC as a Service "PCaaS"), the associated re-appropriation and general lifecycle management of information handling systems requires stricter data privacy. However, private data can remain as residual bits during a system re-appropriation process when a system reaches end of a lifecycle management subscription or is otherwise transferred between different system owners. Some of this private data (such as stored biometric fingerprint credential data for authorized users) requires physical interaction with an information handling system to directly remove specific data. In this regard, removal of such private data requires an information technology (IT) administrator to physically touch every endpoint information handling system to enter local commands via local input/output devices to a separate local OS administrative level diagnostic utility installed by the IT administrator on each respective endpoint information handling system, or to send such a separate highly privileged OS administrative level diagnostic utility across a network to all administered users for each local end user to execute and use locally by entering local commands to the OS administrative level diagnostic utility via local input/output devices to their respective endpoint information handling system. In the latter case, the infrastructure that is administered by the IT administrator can be compromised. In either case, running such an OS administrative level diagnostic utility on each respective endpoint information handling system requires local physical presence and administrative rights, and the OS administrative level diagnostic utility runs entirely in the local OS context on each respective endpoint information handling system to provide instructions to eliminate all stored private data within local device memory.

When an information technology (IT) administrator remotely reinstalls the Windows OS on an endpoint information handling system having a match-on chip fingerprint reader without un-enrolling from Windows Hello, the biometric fingerprint credential data for previous authorized users will remain stored indefinitely in non-volatile memory of the on the match-on chip fingerprint reader. For example, in the case where a large number of endpoint information handling systems owned by a given system owner are retired at the same time and their operating systems reinstalled directly by an IT administrator, the existing biometric fingerprint credential data remains stored in non-volatile memory of the match-on chip fingerprint readers of each of the retired endpoint systems.

When transferring ownership of an endpoint information handling system, it is important to timely and securely erase stored biometric fingerprint credential data from a match-on chip fingerprint reader to protect enterprise data, user data and access to the individual endpoint information handling system. This stored biometric fingerprint credential data for previous authorized users cannot be remotely removed from the non-volatile memory of the match-on chip fingerprint reader. Instead, the IT administrator must have direct physical access to the information handling system to allow the IT administrator to physically touch the endpoint information handling system and directly enter commands via its local input/output devices (e.g., keyboard, mouse, touchpad, touchscreen) to run a separate local fingerprint clearing OS administrative level diagnostic utility locally on the endpoint information handling system itself to clear the stored biometric fingerprint credential data from the non-volatile memory of the match-on chip fingerprint reader. As an alternative to physically touching each endpoint information handling system device, an IT administrator may distribute a secure fingerprint-clearing local OS administrative level diagnostic utility to each local end user of one of the retired endpoint information handling systems, in which case the local OS administrative level diagnostic utility must then be run locally on the retired endpoint information handling system by a respective local end user who is physically touching the retired endpoint information handling system to directly enter commands via its local input/output devices to the OS administrative level diagnostic utility. However, this alternative requires distributing a high value utility application to all local end users, and provides no verification that each local end user will actually run the fingerprint-clearing OS administrative level diagnostic utility on their respective local endpoint system. Running such a local fingerprint clearing OS administrative level diagnostic utility on each respective endpoint information handling system requires local physical presence and administrative rights, and the local fingerprint clearing OS administrative level diagnostic utility runs entirely in the local OS context on each respective endpoint information handling system to provide instructions to eliminate or clear the stored biometric fingerprint credential data from the non-volatile memory of the match-on chip fingerprint reader of the respective endpoint information handling system.

Additionally, in the case that a local end user clears the endpoint operating system of an information handling system without un-enrolling from Windows Hello and the endpoint match-on chip fingerprint reader chip, the biometric fingerprint credential data of the fingerprint template/s stored on the match-on chip fingerprint reader are orphaned and cannot be sanitized. Due to size limitations for biometric template storage on the match-on chip fingerprint reader chip, the number of users and of biometric data instances that can be enrolled on the match-on chip fingerprint reader has been reduced.

Digital Device Identity Secured Component Verification is a technique that creates an integrity protected manifest of a given information handling system and its components during system manufacture.

An authenticated basic input/output system (BIOS) interface (ABI) certificate (International Telecommunication Union (ITU) standard X.509 certificate) may be stored on an endpoint information handling system and used by the endpoint information handling system to ensure the authenticity of a BIOS update image by verifying the digital signature of a BIOS update payload that is deployed to the endpoint information handling system.

SUMMARY OF THE INVENTION

Systems and methods are disclosed herein that may be implemented by services executing on one or more remote servers and on an endpoint information handling system to remotely erase (i.e., clear or remove) biometric fingerprint credential data that is previously stored in reference fingerprint template/s (e.g., in the form of mathematical representation/s of unique physiological fingerprint patterns of the fingers of one or more respective human users) on non-volatile memory of a discrete "match-on chip" fingerprint reader (MOFR) of the endpoint information handling system, as well as to erase separate non-biometric OS user identifier (ID) fingerprint enrollment information stored on separate system non-volatile memory of the endpoint information handling system. Using the disclosed systems and methods, existing stored biometric fingerprint credential data may be timely cleared or erased from a match-on chip fingerprint reader, e.g., to protect enterprise data, user data and access to the individual endpoint information handling system.

In one embodiment, the disclosed systems and methods may be implemented automatically by services executing on one or more remote servers and an endpoint information handling system using a signed data payload (e.g., signed with an authenticated basic input/output system (BIOS) interface "ABI" certificate) to securely clear or erase any existing biometric fingerprint credential data (e.g., one or more biometric fingerprint enrollments of fingerprint template/s) from non-volatile memory of a discrete "match-on chip" fingerprint reader chip that is implemented by a microcontroller that is separate from a host programmable integrated circuit (e.g., such as a host central processor unit "CPU") of the endpoint information handling system. In such an embodiment, the signed payload may include, for example, an attestable serial number of the match-on chip fingerprint reader chip, a unique identifier (e.g., such as a serial number, service tag, digital device identifier (DDID), etc.) that is associated with the information handling system, information regarding a new fingerprint reader command (e.g., a fingerprint credential data erase command that the system BIOS will invoke to erase existing biometric fingerprint credential data, as well as to erase non-biometric OS user ID fingerprint enrollment information), and other certificate related data to verify the signed payload. In one embodiment, the signed payload may be used to remotely erase any existing MOFR reference biometric fingerprint credential data (e.g., reference biometric fingerprint template/s) from the non-volatile memory of a discrete "match-on chip" fingerprint reader chip reader chip without local physical interaction with the information handling system. In one embodiment, such remote erasure of biometric fingerprint credential data may be initiated and performed across a network from a remote information handling system (e.g., such as a information technology "IT" remote administrator server) without requiring IT administrator personnel to be physically present in front of the local endpoint information handling system to enter commands or other information to the local endpoint information handling system via local input/output (I/O) devices coupled to the endpoint information handling system.

In one respect, disclosed herein is a method, including: receiving a data payload in a local information handling system, the local information handling system including at least one host programmable integrated circuit coupled to a separate discrete match-on fingerprint reader (MOFR) integrated circuit, and the data payload including first command information. The method may also include then executing a basic input/output system (BIOS) on the at least one host programmable integrated circuit of the local information handling system to: read the information of the first command from the data payload, and send the information of the first command to the discrete MOFR integrated circuit. The method may also include then executing logic on the discrete MOFR integrated circuit of the local information handling system to respond to receipt of the information of the first command in the discrete MOFR integrated circuit by erasing existing biometric fingerprint credential data from a non-volatile memory of the discrete MOFR integrated circuit.

In another respect, disclosed herein is a system including a local information handling system that includes: at least one host programmable integrated circuit coupled to a separate and discrete match-on fingerprint reader (MOFR) integrated circuit including at least one programmable integrated circuit and non-volatile memory. The at least one host programmable integrated circuit may be programmed to receive a data payload including first command information, and then execute a basic input/output system (BIOS) to: read the information of the first command from the data payload, and send the information of the first command to the discrete MOFR integrated circuit. The at least one programmable integrated circuit of the discrete MOFR integrated circuit may be programmed to respond to receipt of the information of the first command in the discrete MOFR integrated circuit by erasing existing biometric fingerprint credential data from the non-volatile memory of the discrete MOFR integrated circuit.

DESCRIPTION OF ILLUSTRATIVE EMBODIMENTS

Figure 1:
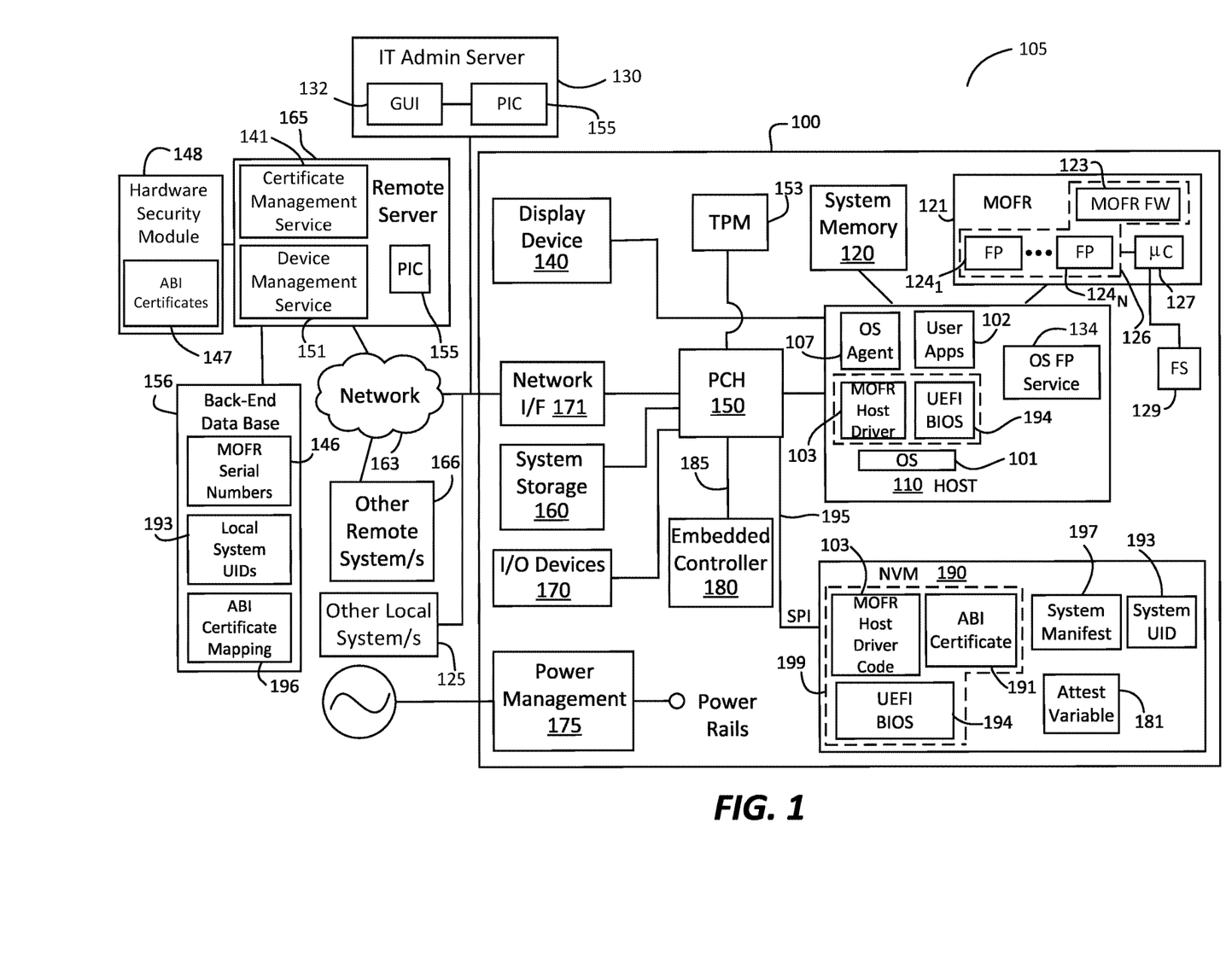
FIG. 1 illustrates a block diagram of an information handling system according to one exemplary embodiment of the disclosed systems and methods.

FIG. 1 is a block diagram of an information handling system 100 (e.g., a desktop computer, computer server, laptop computer, tablet computer, MP3 player, personal data assistant (PDA), cell phone, etc.) as it may be configured and communicatively coupled within a computing environment 105 (e.g., of an enterprise owner) according to one embodiment of the disclosed systems and methods. In one embodiment, information handling system 100 may include a system chassis enclosure (e.g., metal and/or plastic chassis such as notebook computer case, 1U or 2U metal server case, metal or plastic desktop or tower computer case, etc.) that encloses and surrounds system various hardware components, e.g., as illustrated in FIG. 1 by the box labelled 100 that surrounds various system hardware components in in FIG. 1. It will be understood that the configuration of FIG. 1 is exemplary only, and that the disclosed methods may be implemented on other types of information handling systems. It should be further understood that while certain components of an information handling system are shown in FIG. 1 for illustrating embodiments of the disclosed systems and methods, the information handling system is not restricted to including only those components shown in FIG. 1 and described below.

As shown in FIG. 1, information handling system 100 may be a local (e.g., endpoint) client system that may generally include a host programmable integrated circuit 110 programmed to execute an operating system (OS) 101 (e.g., such as Microsoft Windows 10, Linux OS, etc.) with OS fingerprint (FP) service 134, basic input/output system (BIOS) 194 for system 100 (e.g., with a match-on fingerprint reader (MOFR) host driver 103 that is available in the unified extensible firmware interface (UEFI) BIOS partition 199 on non-volatile memory), along with other code such as user software applications 102 (e.g., word processing application, Internet browser, computer game, PDF viewer, spreadsheet application, etc.), a downloaded OS (e.g., software) agent 107, etc. In FIG. 1, host programmable integrated circuit 110 may be configured to access non-volatile memory (NVM) 190 (e.g., serial peripheral interface (SPI) Flash memory) to load and boot part of a system UEFI BIOS 194 (together with MOFR host driver 103) from NVM 190. Other non-volatile memory (NVM) devices may be additionally or alternatively present such as for system storage 160, e.g., including solid state drive/s (SSDs), hard drive/s, etc. Host programmable integrated circuit 110 may include any type of processing device, such as an Intel central processing unit (CPU), an Advanced Micro Devices (AMD) CPU or another programmable integrated circuit. Host programmable integrated circuit 110 is coupled to system memory 120, which may include, for example, random access memory (RAM), dynamic RAM (DRAM), synchronous DRAM (SDRAM), etc. . . .

In the illustrated embodiment, host programmable integrated circuit 110 of system 100 may be coupled to an internal (integrated) display device 140 (e.g., LCD or LED display or other suitable display device) depending on the particular configuration of information handling system 100, with it being understood that a display device may alternatively be provided as an external local component that is coupled system 100. In such an embodiment, integrated graphics capability may be implemented by host programmable integrated circuit 110 to provide visual images (e.g., a graphical user interface, static images and/or video content) to a system user. . . . However, in other embodiments, a separate programmable integrated circuit (e.g., such as graphics processor unit "GPU") may be coupled between host programmable integrated circuit 110 and display device 140 to provide graphics capability for information handling system 100.

Also shown in FIG. 1 is a discrete "match-on chip" fingerprint reader integrated circuit or chip (MOFR) 121 coupled to a fingerprint sensor 129 (e.g., a capacitive fingerprint sensor) that senses biometric fingerprint data from a finger of a current user of system 100 and provides this sensed user biometric fingerprint data to MOFR 121. One example of such a match-on chip fingerprint reader chip is known as a "ControlVault" available from Dell Technologies of Round Rock, Texas. In the embodiment of FIG. 1, MOFR 121 is a secure subsystem that includes a microprocessor 127 that executes logic (e.g., match-on fingerprint reader (MOFR) firmware 123) stored in non-volatile memory of MOFR 121, e.g., to perform fingerprint matching and other tasks as described herein.

In the illustrated embodiment of FIG. 1, existing biometric fingerprint credential data is securely stored in encrypted form as one or more reference fingerprint templates on non-volatile memory 126 of MOFR 121, and includes one or more reference biometrics fingerprint (FP) credential templates 124$_1$ to 124$_N$ for authorized user/s of system 100. This existing biometric fingerprint credential data is stored in non-volatile memory 126 of MOFR 121 in a manner that prevents the user reference biometric fingerprint credential data from being accessed and retrieved from outside the match-on chip. In one embodiment, MOFR firmware 123 of MOFR 121 also supports certain application programming interface (API) commands (e.g., MOFR CONFIG_OBJ commands) that include a FP erasure command (e.g., MOFR_ERASE_FP_ENROLLMENTS) that when invoked causes MOFR firmware 123 to erase or clear all existing fingerprint objects (e.g., biometric fingerprint (FP) credential templates 124$_1$ to 124$_N$) that are stored on non-volatile memory 126 of MOFR 121.

In the embodiment of FIG. 1, microcontroller 127 of MOFR 121 may access, retrieve and decrypt the stored biometric fingerprint credential data (e.g., including reference biometric FP credential templates 124$_1$ to 124$_N$) on non-volatile memory 126, and then compare this retrieved and decrypted reference biometric fingerprint credential data to the currently-sensed user biometric fingerprint data currently provided from fingerprint sensor 129 to determine if this currently-sensed user biometric fingerprint data matches one of the retrieved reference biometric fingerprint credentials (FP) 124$_1$ to 124$_N$ of biometric fingerprint credential data. This fingerprint matching operation is performed entirely within the secure subsystem (e.g., discrete chip) of MOFR 121, and both the currently-sensed user biometric fingerprint data of the current user and the existing stored biometric fingerprint credential data is thus kept separate and apart from the host programmable integrated circuit 110 of the information handling system 100.

Still referring to FIG. 1, fingerprint reader (FR) host driver 103 executing on host programmable integrated circuit 110 provides a communication interface between OS 101 (including OS fingerprint service 134 executing thereon) and MOFR hardware chip device 121 (including MOFR firmware 123 executing thereon), e.g., via application programming interface (API) commands provided across an Inter-Integrated Circuit (I2C) bus that is coupled between host programmable integrated circuit 110 and MOFR 121. As shown, OS fingerprint (FP) service 134 may be an OS fingerprint processing service such as Microsoft Windows Hello available from Microsoft Corporation of Redmond, Washington or may be any other OS fingerprint processing service that is also executing on host programmable integrated circuit 110. Among other things, OS FP service 134 manages and stores non-biometric user identifiers (e.g., non-biometric user identifier (ID) fingerprint enrollments) on system non-volatile memory 190 for one or more authorized users of system 100 that correspond to the respective reference biometric FP credential templates 124$_1$ to 124$_N$ that are separately stored on non-volatile memory 126 of MOFR 121.

However, OS FP service 134 does not have access to the actual biometric FP credential templates 124$_1$ to 124$_N$ stored on non-volatile memory 126 of MOFR 121 that correspond to these authorized user ID enrolments. Rather, OS FP service 134 provides control signals to MOFR 121 to cause MOFR 121 to create, delete and use (e.g., for OS user sign-in purposes) these reference biometric FP credential templates 124$_1$ to 124$_N$ that are stored on non-volatile memory 126 of MOFR 121. In one embodiment, reference biometric FP credential templates 124$_1$ to 124$_N$ may be previously created during a fingerprint reader setup procedure where OS FP 134 implements an algorithm that prompts a currently signed-in authorized user (e.g., an authorized user that is currently signed-in to OS 101 using their OS password or PIN) to place a chosen finger on fingerprint sensor 129 so that fingerprint sensor 129 may read the authorized user's biometric fingerprint data of this chosen finger and provide it to MOFR 121 where it is stored as one of reference biometric FP credential templates 124$_1$ to 124$_N$ corresponding to the authorized user in non-volatile memory 126 of MOFR 121.

During a later normal user sign-in attempt to OS 101, a current system user of system 100 that is not signed-in to OS 101 applies (touches) their chosen finger to the fingerprint sensor 129. Fingerprint sensor 129 responds to this finger touch by sensing biometric fingerprint data from the applied finger of the current user of system 100 and provides this currently-sensed user biometric fingerprint data to MOFR 121, which then compares existing stored biometric fingerprint credential data (e.g., including reference biometric FP credential templates 124$_1$ to 124$_N$) to the currently-sensed user biometric fingerprint data to determine if the currently-sensed user biometric fingerprint data matches any of the fingerprint credentials of the existing stored biometric fingerprint credentials data. MOFR 121 then communicates a data signal (e.g., via MOFR host driver 103) to OS FP service 134 that indicates whether or not MOFR 121 determined that a match exists between the stored biometric fingerprint credential data for authorized user/s and the currently-sensed user biometric fingerprint data. OS FP service 134 then signs the current user in to OS 101 when MOFR 121 indicates that such a match exists, but prevents the current user from signing in to the OS 101 (e.g., without requiring the user to enter their OS password or PIN) when MOFR 121 indicates that such a match does not exist. OS FP service 134 may also perform other tasks, such as controlling MOFR 121 (through MOFR host driver 103) to allow a current system user to make multiple sign-in attempts by reapplying their finger to fingerprint sensor 129, controlling MOFR 121 (through MOFR host driver 103) to create biometric fingerprint credential templates 124$_1$ to 124$_N$ for authorized system users, etc.

In the embodiment of FIG. 1, PCH 150 of system 100 controls certain data paths and manages information flow between components of the information handling system 100. As such, PCH 150 may include one or more integrated controllers or interfaces for controlling the data paths connecting PCH 150 with host programmable integrated circuit 110, system storage 160, input/output (I/O) devices 170 forming at least a part of a user interface for the information handling system, network interface (I/F) device (e.g., network interface controller "NIC") 171, embedded controller (EC) 180, and NVM 190 where UEFI BIOS firmware image 194 may be stored together with persistent MOFR host driver code 103, as well as other code and/or data such as a signed authenticated BIOS interface (ABI) certificate 191, manufacturer unique identifier (UID) 193 (e.g., such as EC UID), and system component manifest 197.

UID 193 may be, for example, a manufacturer-assigned alpha-numeric system service tag or serial number (or a crypto-certified digital device identifier (DDID) based on system serial number) that is stored on current system 100 and that is unique to the particular information handling system machine upon which OS agent 107 is currently executing. This UID 193 may be assigned by the manufacturer at time of the system manufacture, and stored at manufacture on NVM 190 (or other non-volatile memory device of system 100). Local system manifest 197 may be created later, e.g., by a driver that is executing on host programmable integrated circuit 110 during a first time boot sequence for system 100 after delivery of system 100 to an end user) to create an inventory or system manifest 197 of the extracted currently-installed hardware components of system 100, for example, using UEFI commands to retrieve system hardware information. Examples of such commands are described in UEFI Shell Specification (Revision 2.2, Jan. 26, 2016) by Unified EFI, Inc., which is incorporated herein by reference in its entirety for all purposes.

In one embodiment, firmware code for MOFR host driver 103 and an ABI certificate 191 may be provisioned (e.g., populated and stored) along with code for UEFI BIOS code 194 in a UEFI BIOS partition 199 on NVM 190 or other non-volatile memory (e.g., storage system 160) of information handling system 100 at the time of system manufacturing (e.g., during factory install "FI") and originally shipped with system 100 from the manufacturer. An authenticated BIOS interface (ABI) certificate 191 may be signed by a hardware security module (HSM) 148 and may be bound in one embodiment to a given local information handling system 100 by a trusted platform module (TPM) 153 of system 100. In one embodiment, ABI certificate 191 may be an International Telecommunication Union (ITU) standard X.509 certificate including, among other things, a public key (e.g., DSA, ECDSA, RSA, ed25519, etc.), and a certificate signature to verify the owner of the public key, as well as a certificate serial number to identify the particular certificate.

In one embodiment, PCH 150 may include a Serial Peripheral Interface (SPI) controller and an Enhanced Serial Peripheral Interface (eSPI) controller. In some embodiments, PCH 150 may include one or more additional integrated controllers or interfaces such as, but not limited to, a Peripheral Controller Interconnect (PCI) controller, a PCI-Express (PCIe) controller, a low pin count (LPC) controller, a Small Computer Serial Interface (SCSI), an Industry Standard Architecture (ISA) interface, an Inter-Integrated Circuit (I2C) interface, a Universal Serial Bus (USB) interface and a Thunderbolt™ interface.

Also shown present in FIG. 1 is local system storage 160 (e.g., one or more media drives, such as hard disk drives, optical drives, NVRAM, Flash memory, solid state drives (SSDs), or any other suitable form of non-volatile memory) that is coupled through PCH 150 to provide non-volatile storage for information handling system 100.

A power source for the information handling system 100 may be provided via an external power source (e.g., mains power) and an internal power supply regulator, and/or by an internal power source, such as a battery. As shown in FIG. 1, power management system 175 may be included within information handling system 100 for moderating the available power from the power source. In one embodiment, power management system 175 may be coupled to provide operating voltages on one or more power rails to one or more components of the information handling system 100, as well as to perform other power-related administrative tasks of the information handling system.

In the embodiment of FIG. 1, an embedded controller (EC) 180 of system 100 is coupled to PCH 150 and may be configured to perform functions such as power/thermal system management, etc. EC 180 may also be configured to execute program instructions to boot information handling system 100, load application firmware from NVM 190 into internal memory, launch the application firmware, etc. In one example, EC 180 may include a processing device for executing program instructions to perform the above stated functions. Although not strictly limited to such, processing device of EC 180 may be implemented as a programmable integrated circuit (e.g., a controller, microcontroller, microprocessor, ASIC, etc., or as a programmable logic device "PLD" such as FPGA, complex programmable logic device "CPLD", etc.). In computer server embodiments, a baseboard management controller (BMC) may be present in the place of EC 180 to perform one or more similar functions as described above for EC 180, as well as to perform other functions specific to computer servers.

As shown in FIG. 1, EC 180 is coupled to PCH 150 via data bus 185, and NVM 190 is coupled to PCH 150 via data bus 195. According to one embodiment, data bus 195 is a Serial Peripheral Interface (SPI) bus, and data bus 185 is an Enhanced Serial Peripheral Interface (eSPI) bus. In the embodiment shown in FIG. 1, NVM 190 may be a SPI Flash memory device that is a shared Flash memory device, which is connected to PCH 150 and EC 180. In such a configuration, PCH 150 provides EC 180 shared access to NVM 190 via eSPI bus 185, SPI bus 195 and various interface and logic blocks included within the PCH.

As further shown in FIG. 1, external and/or internal (integrated) I/O devices 170 (e.g., a keyboard, mouse, touchpad, touchscreen, etc.) may be coupled to PCH 150 of system 100 to enable the system end user to input data and interact with information handling system 100, and to interact with application programs or other software/firmware executing thereon. The network I/F device 171 may in one embodiment be a network interface controller (NIC) which may communicate with external network 163, e.g., optionally across an intervening local area network (LAN), wireless LAN (WLAN), cellular network, corporate intranet, etc. As shown, the network I/F device 171 may be present to enable wired and/or wireless communication across an external network 163 (e.g., such as the Internet and optionally one or more intervening networks) with a remote server information handling system 165 (e.g., such as an original equipment manufacturer "OEM" remote server operated and maintained by the original equipment manufacturer (OEM) or other manufacture of information handling system 100), and optionally with one or more other remote information handling systems, e.g., configured as of other remote server/s 166.

As further shown, network I/F device 171 may also provide communication (e.g., across an internal network such as a corporate intranet) with an information technology (IT) administrative server 130 (e.g., as may be maintained by a current enterprise owner of information handling system 100 and operated by a human IT administrator or IT decision maker "ITDM" of the current enterprise owner) that monitors and administers information handling system 100, and with other local information handling systems 125 (e.g., configured with similar or the same components and architecture as local system 100) that may also be monitored and administered by IT administrative server 130. Each of remote information handling systems 165 and 166, and administrative server 130, may in one embodiment be positioned at respective locations that are physically remote from position/s of each of local information handling system/s 100 and/or 125, and may also be positioned at respective locations that are physically remote from each other.

Examples of other remote servers 166 include, but are not limited to, a remote tech portal server (e.g., executing Dell TechDirect from Dell Technologies Inc. of Round Rock, Texas) that may implement an embedded repository manager logic such as Dell Cloud Command Repository Manager (DCCRM) from Dell Technologies Inc. of Round Rock, Texas) that may be present to make available software and/or firmware catalog/s across network 163 to local systems 100/125, a remote catalog server (e.g., such as Microsoft Endpoint Configuration Manager "MEMCM" available from Microsoft Corporation of Redmond, Washington) that may be optionally present to contain and deploy update packages across network 163 to local systems 100/125 that are provided, for example, by an OEM manufacturer of endpoint client system 100, a remote server that hosts an OEM portal (e.g., OEM.com) through which each enterprise owner may be allowed to login across network 163 to their respective OEM user account that is maintained and administered by the OEM of the system 100 using remote OEM server information handling system 165 and/or 166, etc.

Although described herein in relation to an OEM of a local information handling system 100/125, it will be understood that the disclosed systems and methods may be similarly implemented with other types of manufacturers of an information handling systems 100/125, e.g., that maintain and operate corresponding manufacturer server information handling systems 165 and/or 166.

As shown in FIG. 1, a device management service 151 and certificate management service 141 may be executed together (e.g., as part of a cloud management service or a backend orchestration service) on a programmable integrated circuit (PIC) 155 (e.g., CPU) of OEM remote server 165. A backend database 156 storing MOFR serial numbers 146 and local system UIDs 193 may also be maintained in non-volatile storage of OEM remote server 165 or may be otherwise communicatively coupled or accessible by OEM remote server 165, e.g., such as maintained on a separate device or information handling system that is separate from remote server 165. Backend database 156 may also store ABI certificate mapping information 196 (e.g., look up table or other type of relationship) that maps the UID 193 (e.g., serial number, service tag, etc.) of each given local system 100 or 125 to its particular existing ABI certificate 191 (i.e., already provisioned and stored in UEFI BIOS partition 199 on the given local system 100/125 during system manufacture) and to the unique serial number of its MOFR 121 as shown in the example lookup Table 1 below. In one embodiment, MOFR serial numbers 146 associated with each of local system 100 and each of other local systems 125 may be captured for inclusion in backend database 156 during the system manufacture process of each local system 100/125 (e.g., using AsBuilt or Secured Component Verification "SCV" techniques available from Dell Technologies, Inc. of Round Rock, Texas).

TABLE 1

ABI Certificate Mapping Information

| Local information Handling System UID | Identifier (e.g. serial number) of the signed ABI Certificate Provisioned on the Local Information Handling System | Captured Serial Number of the MOFR provisioned on the Local Information Handling System |
|---|---|---|
| xxxxxxx1 | yyyyyyy1 | zzzzzzz1 |
| xxxxxxx2 | yyyyyyy2 | zzzzzzz2 |
| ... | ... | ... |
| xxxxxxxN | yyyyyyyN | zzzzzzzN |

These components of OEM remote server 165 may be executed in a manner described further herein using code executed by programmable integrated circuit 155 (e.g., CPU) of OEM remote server 165. A hardware security module (HSM) 148 may be coupled as shown to remote server 165, and may store respective unique ABI certificates 147 in non-volatile memory that correspond to different local endpoint information handling systems 100/125. HSM 148 may also contain private keys and public keys for signing ABI data payloads prior to deployment as described further herein.

Also shown in FIG. 1 is a graphical user interface (GUI) 132 coupled to a programmable integrated circuit 155 of IT administrative server 130. It will be understood that OEM remote server 165, IT administrative server 130, and each of remote information handling systems 166 may be configured in one embodiment with similar components and system architecture as information handling system 100. Moreover, it is possible that the tasks of remote server 165 may be performed (e.g., partitioned) between multiple remote servers 165 that are all communicatively coupled to network 163. An example of backend orchestration service tasks (including lifecycle management subscription tasks) that may be additionally implemented by management service 151 in one embodiment are described in U.S. patent application Ser. No. 17/542,360 filed on Dec. 3, 2021, which is incorporated herein by reference in its entirety for all purposes.

Figure 2:
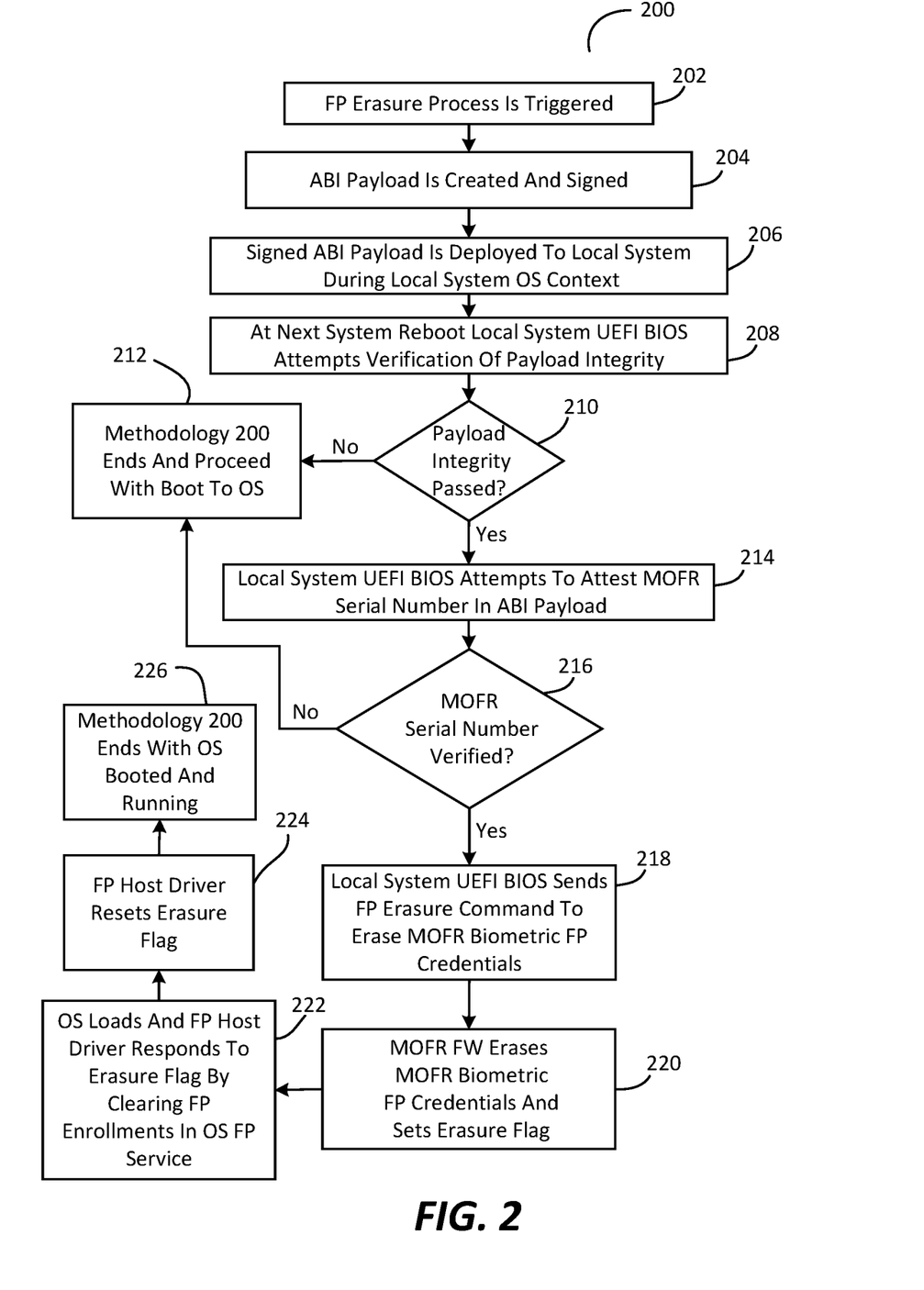
FIG. 2 illustrates methodology according to one exemplary embodiment of the disclosed systems and methods.
Figure 3:
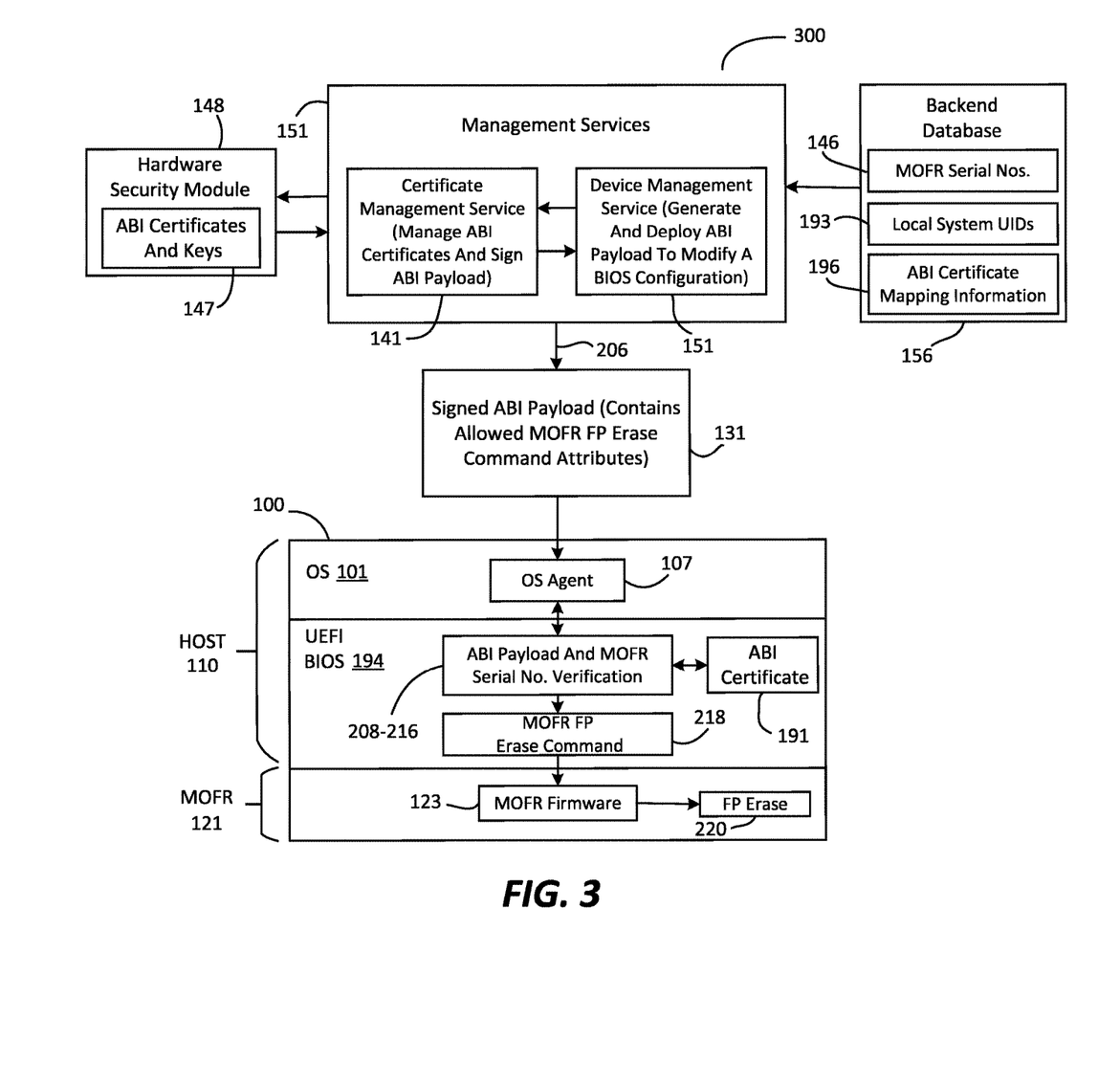
FIG. 3 illustrates methodology according a relationship of tasks performed by certain hardware and logic components according to one exemplary embodiment of the disclosed systems and methods.
Figure 4:
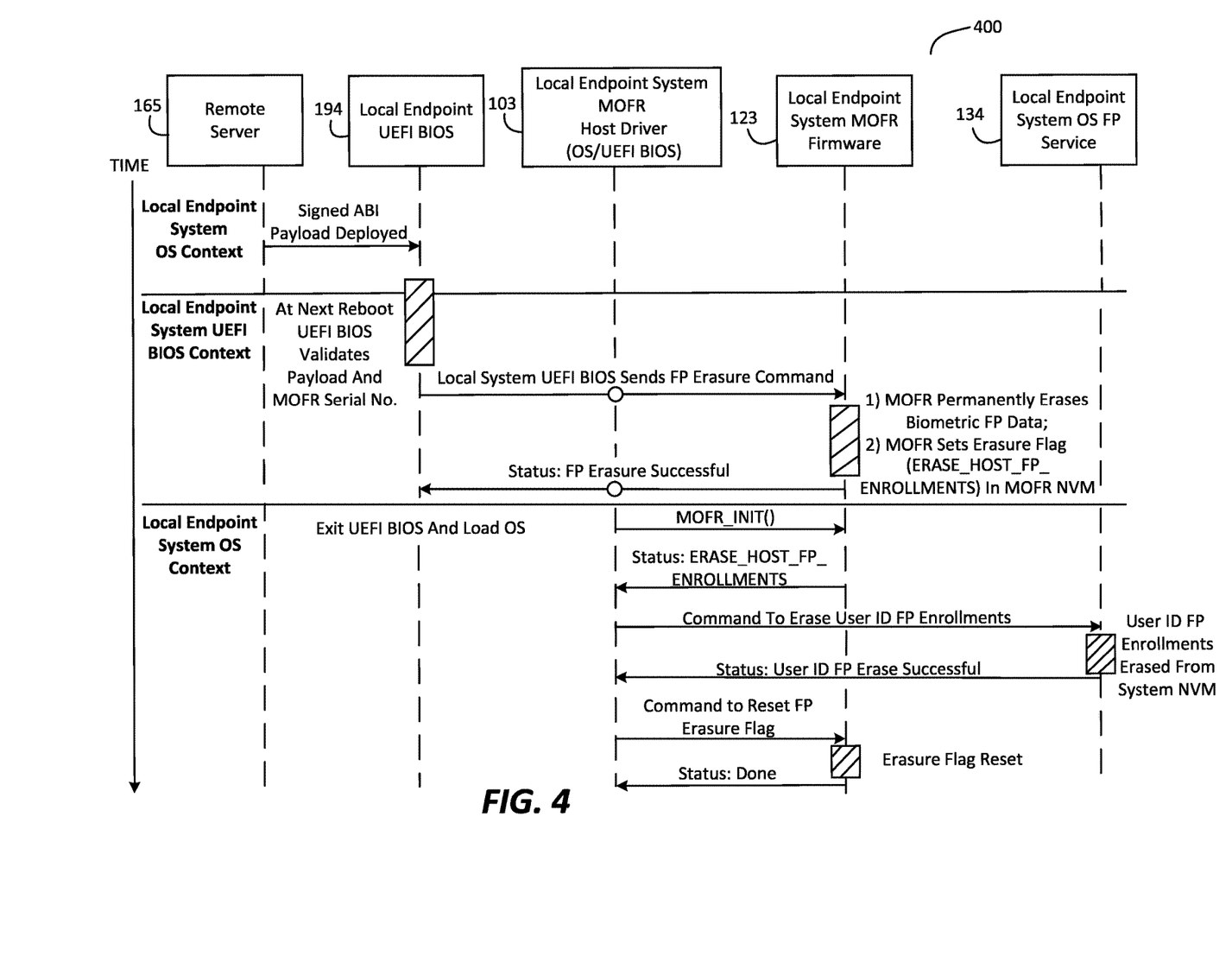
FIG. 4 illustrates a certain sequential events according to one exemplary embodiment of the disclosed systems and methods.

FIG. 2 illustrates an exemplary embodiment of a methodology 200 that may be implemented to remotely erase (i.e., clear or remove) existing biometric fingerprint credential data (e.g., biometric fingerprint (FP) credential templates $124_1$ to $124_N$) from non-volatile memory 126 of MOFR 123 of the information handling system 100 of FIG. 1. FIG. 3 illustrates one exemplary embodiment of a relationship 300 of tasks performed by hardware and logic components of remote server 165 and endpoint information handling system 100 during methodology 200. FIG. 4 illustrates one exemplary embodiment of certain sequential events 400 performed during methodology 200.

As shown in FIG. 2, methodology 200 begins in block 202 where the fingerprint erasure process is triggered or initiated for at least local information handling system 100 and/or for other local information handling systems 125, e.g., by an IT administrative user entering a FP erasure request or selecting "FP enrollments erasure option" displayed on the GUI 132 of the IT administrator server 130. This erasure request or selected FP erasure option may identify the system UID 193 of the local information handling system/s 100 and/or 125 from which FP data is to be erased. This may be desirable to do, for example, when an enterprise owner retires from service one or more local information handling systems 100 and/or 125, or when a local user clears the OS 101 on a local information handling system 100 and/or other local information handling system 125 without un-enrolling from OS FP service 134. In either case, biometric fingerprint (FP) credential templates $124_1$ to $124_N$ remain stored in (and non-erased from) non-volatile memory 126 of MOFR 121.

In block 202, the FP erasure request command is forwarded across network 163 from IT administrative server 130 to remote server 165 for a given local information handling system 100/125 (e.g., identified by the UID 193 included in the FP erasure request).

In block 204, remote server 165 responds to receipt of this FP erasure command by executing device management service 151 to access the MOFR serial numbers 146, local system UIDs 193, and/or ABI certificate mapping information 196 maintained on backend database 156 to generate an ABI data payload 131 that includes the serial number of the existing ABI certificate 191 provisioned on the given local information handling system 100/125, the MOFR serial number 146 of the MOFR chip 121 of the given local information handling system 100/125, and information about the MOFR FP erasure command that UEFI BIOS 194 is to invoke on the MOFR 121 of the given local information handling system 100/125. In one embodiment, the information about the MOFR FP erasure command that UEFI BIOS 194 is to invoke may include a description of allowed attribute/s (e.g., "MOFR_ERASE_FP_ENROLLMENTS") that identifies the FP erasure command that enable MOFR firmware 123 to erase or clear all existing biometric fingerprint (FP) credential templates $124_1$ to $124_N$ that are stored on non-volatile memory 126 of MOFR 121 on the given local endpoint information handling system 100/125. Then in block 204, remote server 165 executes certificate management service 141 to include other certificate-related data in ABI payload 131 that may be used by UEFI BIOS 194 to verify the ABI payload 131, e.g., by causing HSM 148 to sign the ABI payload 131 with the ABI private key associated with the signed ABI certificate 191 that is already provisioned on the given information handling system 100/125.

In one embodiment, the information about the MOFR FP erasure command that UEFI BIOS 194 is to invoke may include a description or other identification of allowed attribute/s (e.g., including the MOFR_ERASE_FP_ENROLLMENTS command) that enables MOFR firmware 123 to erase or clear all existing fingerprint objects (e.g., biometric FP credential templates $124_1$ to $124_N$) that are stored on non-volatile memory 126 of MOFR 121 on the given local endpoint information handling system 100/125.

In block 206, remote server 165 next causes the signed ABI payload 131 of block 204 to be deployed across network 163 to the given local endpoint information handling system 100/125. For example, in one embodiment, signed ABI payload 131 of block 204 may be deployed in block 206 to OS agent 107 on the given local information handling system 100/125 during a context of runtime of OS 101 using existing management channels, e.g., via another remote server 166 such as a tech portal server executing Dell TechDirect and implementing Dell Cloud Command Repository Manager, a catalog server such as Microsoft Endpoint Configuration Manager, etc. As shown in FIG. 3, OS agent 107 receives and handles ABI payload 131 of block 206 for further processing by local UEFI BIOS 194 in the following blocks of methodology 200. For example, in one embodiment, OS agent 107 may forward the received ABI payload 131 to UEFI BIOS 194 which may then store the received ABI payload 131 in UEFI BIOS partition 199 of system non-volatile memory 190 for future retrieval and use by local UEFI BIOS 194 at the next system reboot as further described herein. However, in another embodiment, UEFI BIOS 194 may immediately execute to perform the UEFI BIOS tasks of the following blocks of methodology 200 without rebooting (and without storing the received ABI payload 131 in UEFI BIOS partition 199 of system non-volatile memory 190).

Next, in block 208, at the next reboot of the given local information handling system 100/125 the local UEFI BIOS 194 of the given local information handling system 100/125 retrieves the ABI payload 131 from UEFI BIOS partition 199 and first attempts to verify integrity of the deployed ABI payload 131 during the context of the local UEFI BIOS session executing on host programmable integrated circuit 110 by verifying the signature of the deployed ABI payload 131 versus the signature of the existing ABI certificate 191 stored on the given local information handling system 100/125. However, as previously described, in an alternative embodiment UEFI BIOS 194 may proceed directly without rebooting from block 206 to the following blocks of methodology 200 (beginning with the tasks of block 208). In such an alternative case, the received ABI payload 131 need not be stored in UEFI BIOS partition 199 of system non-volatile memory 190 in block 206 since UEFI BIOS 194 maintains the received ABI payload 131 in a BIOS partition of volatile system memory 120.

If the signature of the deployed ABI payload 131 does not match the signature of the existing ABI certificate 191, then the ABI payload integrity verification fails in block 210 and methodology 200 terminates in block 212 in block 212 and the local system reboot proceeds to load the OS 101 on host programmable integrated circuit 110 without erasure of any existing FP objects (e.g., biometric FP credential templates $124_1$ to $124_N$) from non-volatile memory 126 of MOFR 121.

However, if the signature of the deployed ABI payload 131 matches the signature of the existing ABI certificate 191, then the ABI payload integrity verification passes in block 210 and methodology 200 proceeds to block 214 (still during the context of the same local UEFI BIOS session executing on host programmable integrated circuit 110) where the local UEFI BIOS 194 of the given local information handling system 100/125 next attempts to attest that the MOFR serial number contained within the deployed ABI payload 131 matches the actual unique serial number of the MOFR 123 of the given local information handling system 100/125 (e.g., the actual unique serial number of the MOFR 123 may be listed or otherwise contained in the pre-existing information of system manifest 197 stored on system NVM 190, and then accessed by UEFI BIOS 194 for use in block 214). This additional attestation step may be optionally employed in one embodiment to provide an additional layer of security for the fingerprint credential erasure process.

If in block 214 the MOFR serial number contained within the deployed ABI payload 131 does not match the actual serial number of the MOFR 123 of the given local information handling system 100/125 in block 214, then the MOFR serial number attestation fails in block 216, methodology 200 terminates in block 212, and the local system reboot proceeds to load the OS 101 on host programmable integrated circuit 110 without erasure of any existing FP objects (e.g., biometric FP credential templates $124_1$ to $124_N$) from non-volatile memory 126 of MOFR 121. However, if the MOFR serial number contained within the deployed ABI payload 131 matches the actual serial number of the MOFR 123 of the given local information handling system 100/125 in block 214, then the MOFR serial number is verified and attestation passes in block 216, and only then does methodology 200 proceed to block 218 while still operating the context of the same local UEFI BIOS session executing on host programmable integrated circuit 110.

Block 218 of methodology 200 next proceeds during the context of the same local UEFI BIOS session executing on host programmable integrated circuit 110. In block 216, the local UEFI BIOS 194 of the given local information handling system 100/125 reads the description or other identification of the FP erasure command (e.g., MOFR_ERASE_FP_ENROLLMENTS) specified in the allowed attributes of the ABI payload 131 forwards the description of this FP erasure command (e.g., via MOFR host driver 103) to MOFR firmware 123 executing on microcontroller 127 of MOFR 121. Then in block 220, MOFR firmware 123 executing on microcontroller 127 of MOFR 121 responds to the received description of the FP erasure command (received in block 218) by:1) invoking and performing the specified FP erasure command (e.g., MOFR_ERASE_FP_ENROLLMENTS) to permanently erase all existing FP objects (e.g., biometric FP credential templates $124_1$ to $124_N$) from non-volatile memory 126 of MOFR 121;

and then 2) setting a FP erasure flag (e.g., ERASE_HOST_FP_ENROLLMENTS flag) in non-volatile memory 126 of MOFR 121 that indicates that the all existing FP objects (e.g., biometric FP credential templates $124_1$ to $124_N$) have been successfully erased from non-volatile memory 126 of MOFR 121. After block 220 is completed, the OS 101 is booted on host programmable integrated circuit 110, the local UEFI BIOS execution session terminates, and methodology 200 proceeds to block 222 as shown.

Blocks 222 and 224 of methodology 200 next proceed while OS 101 executes on host programmable integrated circuit 110. In block 222, FP host driver 103 executes on host programmable integrated circuit 110 to retrieve and read the FP erasure flag (e.g., ERASE_HOST_FP_ENROLLMENTS flag) from non-volatile memory 126 of MOFR 121, and responds to the presence of this FP erasure flag to trigger or cause erasure or clearing of all FP user ID enrollments for OS 101 from local system non-volatile memory 190 that are maintained for previous authorized users by OS FP service 134 (e.g., such as Windows Hello). Then, in block 224, FP host driver 103 executes to (e.g., to cause MOFR FW 123) to clear or erase the presence of the FP erasure flag (e.g., ERASE_HOST_FP_ENROLLMENTS flag) from non-volatile memory 126 of MOFR 121. Methodology 200 then terminates in block 226 with OS 101 booted and executing.

It will understood that the particular combination of tasks or functions of the blocks of FIGS. 2-4 are exemplary only, and that other combinations of additional and/or alternative tasks or functions may be employed that are suitable for remotely erasing biometric fingerprint credential data that is previously stored on separate non-volatile memory of a discrete "match-on chip" fingerprint reader (MOFR) of an endpoint information handling system as well as to erase non-biometric OS user ID fingerprint enrollment data stored on separate system non-volatile memory of the endpoint information handling system.

It will also be understood that one or more of the tasks, functions, or methodologies described herein (e.g., including those described herein for components 101, 102, 103, 107, 110, 123, 125, 130, 132, 134, 141, 148, 151, 152, 155, 156, 165, 166, 175, 180, 194, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program includes instructions that are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps, tasks and/or functions of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an processing system or component thereof. The executable instructions may include a plurality of code segments operable to instruct components of an processing system to perform the methodologies disclosed herein.

It will also be understood that one or more steps, tasks and/or functions of the present methodologies may be employed in one or more code segments of the computer program. For example, a code segment executed by the information handling system may include one or more steps, tasks and/or functions of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method, comprising:
    executing a discrete match-on fingerprint reader (MOFR) integrated circuit as a secure subsystem of a local information handling system to:
        communicate with a separate fingerprint sensor of the local information handling system that is separate and different from the secure subsystem of the discrete MOFR integrated circuit and that is outside the secure subsystem of the discrete MOFR integrated circuit,
        create templates of reference biometric fingerprint credential data within the secure subsystem of the discrete MOFR integrated circuit, and store the created templates of the reference biometric fingerprint credential data in a non-volatile memory of the secure subsystem of the discrete MOFR integrated circuit, the created reference biometric fingerprint credential data being securely stored in encrypted form in the non-volatile memory of the discrete MOFR integrated circuit in a manner that prevents the reference biometric fingerprint credential data from being accessed from outside the secure subsystem of the discrete MOFR integrated circuit and that keeps the reference biometric fingerprint credential data separate and apart from a host programmable integrated circuit of the local information handling system that is separate from and coupled to the discrete MOFR integrated circuit;

receiving a data payload in the local information handling system, the data payload including first command information;

then executing a basic input/output system (BIOS) on the at least one host programmable integrated circuit of the local information handling system to:
   read the information of the first command from the data payload, and
   send the information of the first command to the discrete MOFR integrated circuit; and then executing logic on the discrete MOFR integrated circuit of the local information handling system to respond to receipt of the information of the first command in the discrete MOFR integrated circuit by erasing the existing stored reference biometric fingerprint credential data from a non-volatile memory of the discrete MOFR integrated circuit; and where the method further comprises receiving currently-sensed user biometric fingerprint data from the separate fingerprint sensor of the local information handling system in the discrete MOFR integrated circuit, and executing logic on the discrete MOFR integrated circuit to:
   decrypt and compare the stored reference biometric fingerprint credential data to the received currently-sensed user biometric fingerprint data entirely within the secure subsystem of the discrete MOFR integrated circuit to determine if the currently-sensed user biometric fingerprint data matches the stored reference biometric fingerprint credential data, and
   then communicate a data signal to the host programmable integrated circuit of the local information handling system that indicates whether or not the discrete MOFR integrated circuit has determined that a match exists between the stored reference biometric fingerprint credential data and the currently-sensed user biometric fingerprint data.

2. The method of claim 1, where the data payload is deployed across at least one network from a first remote information handling system to the local information handling system; and where the receiving the data payload further comprises receiving the deployed data payload across the at least one network from the first remote information handling system.

3. The method of claim 2, further comprising:
   receiving a second command across the at least one network in the first remote information handling system from a second remote information handling system prior to deploying the data payload across the at least one network from the first remote information handling system to the local information handling system; and
   then responding to the receipt of the second command in the first remote information handling system by deploying the data payload across the at least one network from the first remote information handling system to the local information handling system.

4. The method of claim 3, where the local information handling system comprises a local endpoint information handling system; where the first remote information handling system comprises a remote server information handling system coupled by the at least one network to the local endpoint information handling system; and where the second remote information handling system comprises an administrative server coupled by the at least one network to the first remote information handling system and the second remote information handling system.

5. The method of claim 1, where the deployed data payload is a signed data payload; and where the method further comprises executing the BIOS on the at least one host programmable integrated circuit of the local information handling system to:
   attempt to verify a signature of the signed data payload prior to the reading and the sending of the information of the first command to the discrete MOFR integrated circuit; and
   then perform the reading and sending the information of the first command to the discrete MOFR integrated circuit only if the signature of the signed data payload is verified.

6. The method of claim 5, where the method further comprises executing the BIOS on the at least one host programmable integrated circuit of the local information handling system to retrieve a pre-existing certificate from a system non-volatile memory of the local information handling system, and to use the retrieved pre-existing certificate to attempt to verify the signed data payload.

7. The method of claim 1, further comprising:
   executing the logic on the discrete MOFR integrated circuit of the local information handling system to provide to the at least one host programmable integrated circuit of the local information handling system information confirming the completion of erasure of the existing biometric fingerprint credential data from a non-volatile memory of the discrete MOFR integrated circuit; and
   then only upon the providing of the information confirming the completion of erasure of the existing biometric fingerprint credential data, executing a host operating system (OS) on the at least one host programmable integrated circuit of the local information handling system to:
      respond to the provided information confirming the completion of the erasure of the existing biometric fingerprint credential data from the non-volatile memory of the discrete MOFR integrated circuit by then erasing previously-stored non-biometric OS user identifier (ID) fingerprint enrollment information corresponding to the erased biometric fingerprint credential data from a system non-volatile memory of the local information handling system.

8. The method of claim 7, where the information confirming the completion of the erasure of the existing biometric fingerprint credential data comprises a flag set in the non-volatile memory of the discrete MOFR integrated circuit; and where the method further comprises erasing the flag after the erasing of the previously-stored non-biometric OS user identifier (ID) fingerprint enrollment information corresponding to the erased biometric fingerprint credential data from the system non-volatile memory of the local information handling system.

9. The method of claim 1, further comprising operating the host programmable integrated circuit as an interface for all communications to and from the discrete MOFR integrated circuit; executing a host operating system (OS) on the at least one host programmable integrated circuit of the local information handling system to perform the receiving of the data payload in the local information handling system during a runtime context of the host OS; and then at the next system reboot executing the BIOS on the at least one host programmable integrated circuit of the local information handling system to perform the reading of the information of the first command from the data payload, and the sending of the information of the first command to the discrete MOFR integrated circuit.

10. The method of claim 1, further comprising routing all communications to and from the discrete MOFR integrated circuit through a host driver executing on the host programmable integrated circuit of the local information handling system.

11. A method, comprising:
receiving a data payload in a local information handling system, the local information handling system comprising at least one host programmable integrated circuit coupled to a separate discrete match-on fingerprint reader (MOFR) integrated circuit, and the data payload including first command information;
then executing a basic input/output system (BIOS) on the at least one host programmable integrated circuit of the local information handling system to:
read the information of the first command from the data payload, and
send the information of the first command to the discrete MOFR integrated circuit; and
then executing logic on the discrete MOFR integrated circuit of the local information handling system to respond to receipt of the information of the first command in the discrete MOFR integrated circuit by erasing existing biometric fingerprint credential data from a non-volatile memory of the discrete MOFR integrated circuit;
where the deployed data payload is a signed data payload; and where the method further comprises executing the BIOS on the at least one host programmable integrated circuit of the local information handling system to:
attempt to verify a signature of the signed data payload prior to the reading and the sending of the information of the first command to the discrete MOFR integrated circuit, and
then perform the reading and sending the information of the first command to the discrete MOFR integrated circuit only if the signature of the signed data payload is verified; and
where the information of the signed data payload comprises a serial number, and where the method further comprises executing the BIOS on the at least one host programmable integrated circuit of the local information handling system to:
read the serial number from the signed data payload, attempt to attest that the serial number read from the signed data payload matches an actual unique serial number of the MOFR of the local information handling system by comparing the serial number read from the signed data payload to the actual unique serial number of the MOFR of the local information handling system, and
then perform the sending of the information of the first command to the discrete MOFR integrated circuit only if the serial number read from the signed data payload is attested to match the actual unique serial number of the MOFR of the local information handling system.

12. A system, comprising a local information handling system that comprises:
at least one host programmable integrated circuit coupled to a separate and discrete match-on fingerprint reader (MOFR) integrated circuit that itself is a secure subsystem of the local information handling system, the discrete MOFR integrated circuit comprising at least one programmable integrated circuit and non-volatile memory;
a separate fingerprint sensor coupled to the discrete MOFR integrated circuit, the fingerprint sensor being separate and different from the secure subsystem of the discrete MOFR integrated circuit and being outside the secure subsystem of the discrete MOFR integrated circuit;
where the discrete MOFR integrated circuit is programmed to:
create templates of reference biometric fingerprint credential data within the secure subsystem of the discrete MOFR integrated circuit, and
store the created templates of the reference biometric fingerprint credential data in a non-volatile memory of the secure subsystem of the discrete MOFR integrated circuit, the created reference biometric fingerprint credential data being securely stored in encrypted form in the non-volatile memory of the discrete MOFR integrated circuit in a manner that prevents the reference biometric fingerprint credential data from being accessed from outside the secure subsystem of the discrete MOFR integrated circuit and that keeps the reference biometric fingerprint credential data separate and apart from the host programmable integrated circuit of the local information handling system that is separate from and coupled to the discrete MOFR integrated circuit;
where the at least one host programmable integrated circuit of the local information handling system is programmed to receive a data payload including first command information, and then to execute a basic input/output system (BIOS) to:
read the information of the first command from the data payload, and
send the information of the first command to the discrete MOFR integrated circuit; and
where the at least one programmable integrated circuit of the discrete MOFR integrated circuit is programmed to respond to receipt of the information of the first command in the discrete MOFR integrated circuit by erasing the existing stored reference biometric fingerprint credential data from the non-volatile memory of the discrete MOFR integrated circuit; and
where the at least one programmable integrated circuit of the discrete MOFR integrated circuit is further programmed to:
receive currently-sensed user biometric fingerprint data from the separate fingerprint sensor of the local information handling system;

decrypt and compare the stored reference biometric fingerprint credential data to the received currently-sensed user biometric fingerprint data entirely within the secure subsystem of the discrete MOFR integrated circuit to determine if the currently-sensed user biometric fingerprint data matches the stored reference biometric fingerprint credential data, and then communicate a data signal to the host programmable integrated circuit of the local information handling system that indicates whether or not the discrete MOFR integrated circuit has determined that a match exists between the stored reference biometric fingerprint credential data and the currently-sensed user biometric fingerprint data.

13. The system of claim 12, further comprising a first remote information handling system coupled to the local information handling system by the at least one network, the first remote information handling system comprising at least one programmable integrated circuit programmed to deploy the data payload across the at least one network from the first remote information handling system to the local information handling system.

14. The system of claim 13, further comprising:
a second remote information handling system coupled to the first local information handling system and the local information handling system by the at least one network, the second remote information handling system comprising at least one programmable integrated circuit programmed to provide a second command across the at least one network to the first remote information handling system;
where the at least one programmable integrated circuit of the first remote information handling system is programmed to then respond to the receipt of the second command in the first remote information handling system by deploying the data payload across the at least one network from the first remote information handling system to the local information handling system.

15. The system of claim 14, where the local information handling system comprises a local endpoint information handling system; where the first remote information handling system comprises a remote server information handling system coupled by the at least one network to the local endpoint information handling system; and where the second remote information handling system comprises an administrative server coupled by the at least one network to the first remote information handling system and the second remote information handling system.

16. The system of claim 12, where the deployed data payload is a signed data payload; and where the at least one host programmable integrated circuit of the local information handling system is further programmed to executed the BIOS to:
attempt to verify a signature of the signed data payload prior to the reading and the sending of the information of the first command to the discrete MOFR integrated circuit; and
then perform the reading and sending the information of the first command to the discrete MOFR integrated circuit only if the signature of the signed data payload is verified.

17. The system of claim 16, where the local information handling system further comprises system non-volatile memory coupled to the at least one host programmable circuit; and
where the at least one host programmable integrated circuit of the local information handling system is further programmed to execute the BIOS to retrieve a pre-existing certificate from the system non-volatile memory of the local information handling system, and to use the retrieved pre-existing certificate to attempt to verify the signed data payload.

18. The system of claim 12, where the local information handling system further comprises:
system non-volatile memory coupled to the host programmable integrated circuit;
where the at least one programmable integrated circuit of the discrete MOFR integrated circuit of the local information handling system is programmed to provide to the at least one host programmable integrated circuit of the local information handling system information confirming the completion of erasure of the existing biometric fingerprint credential data from a non-volatile memory of the discrete MOFR integrated circuit; and
where the at least one host programmable integrated circuit of the local information handling system is programmed to then only upon receiving the provided information confirming the completion of the erasure of the existing biometric fingerprint credential data from the non-volatile memory of the discrete MOFR integrated circuit, erasing previously-stored non-biometric OS user identifier (ID) fingerprint enrollment information corresponding to the erased biometric fingerprint credential data from the system non-volatile memory of the local information handling system.

19. The system of claim 18, where the information confirming the completion of the erasure of the existing biometric fingerprint credential data comprises a flag set in the non-volatile memory of the discrete MOFR integrated circuit; and where the at least one programmable integrated circuit of the discrete MOFR integrated circuit of the local information handling system is programmed to erase the flag after the erasing of the previously-stored non-biometric OS user identifier (ID) fingerprint enrollment information corresponding to the erased biometric fingerprint credential data from the system non-volatile memory of the local information handling system.

20. The system of claim 12, where the at least one host programmable integrated circuit of the local information handling system is coupled as an interface for all communications to and from the discrete MOFR integrated circuit, the at least one host programmable integrated circuit being programmed to:
execute a host operating system (OS) to perform the receiving of the data payload in the local information handling system during a runtime context of the host OS; and
then at the next system reboot execute the BIOS to perform the reading of the information of the first command from the data payload, and the sending of the information of the first command to the discrete MOFR integrated circuit.

21. The system of claim 12, where the host programmable integrated circuit of the local information handling system is programmed to execute a host driver and to route all communications to and from the discrete MOFR integrated circuit through the host driver.

22. A system, comprising a local information handling system that comprises:
at least one host programmable integrated circuit coupled to a separate and discrete match-on fingerprint reader (MOFR) integrated circuit comprising at least one programmable integrated circuit and non-volatile memory;

where the at least one host programmable integrated circuit is programmed to receive a data payload including first command information, and then execute a basic input/output system (BIOS) to:
    read the information of the first command from the data payload, and
    send the information of the first command to the discrete MOFR integrated circuit;

where the at least one programmable integrated circuit of the discrete MOFR integrated circuit is programmed to respond to receipt of the information of the first command in the discrete MOFR integrated circuit by erasing existing biometric fingerprint credential data from the non-volatile memory of the discrete MOFR integrated circuit;

where the deployed data payload is a signed data payload; and where the at least one host programmable integrated circuit of the local information handling system is further programmed to executed the BIOS to:
    attempt to verify a signature of the signed data payload prior to the reading and the sending of the information of the first command to the discrete MOFR integrated circuit, and
    then perform the reading and sending the information of the first command to the discrete MOFR integrated circuit only if the signature of the signed data payload is verified; and where the information of the signed data payload comprises a serial number, and where the at least one host programmable integrated circuit of the local information handling system is further programmed to execute the BIOS to:
    read the serial number from the signed data payload,
        attempt to attest that the serial number read from the signed data payload matches an actual unique serial number of the MOFR of the local information handling system by comparing the serial number read from the signed data payload to the actual unique serial number of the MOFR of the local information handling system, and
        then perform the sending of the information of the first command to the discrete MOFR integrated circuit only if the serial number read from the signed data payload is attested to match the actual unique serial number of the MOFR of the local information handling system.

\* \* \* \* \*